Jan. 31, 1956
J. C. HIGGINS
2,732,913
MUFFLER, SPARK ARRESTER, AND WATER TRAP FOR INTERNAL
COMBUSTION ENGINES HAVING VERTICAL STACKS
Filed Oct. 11, 1954
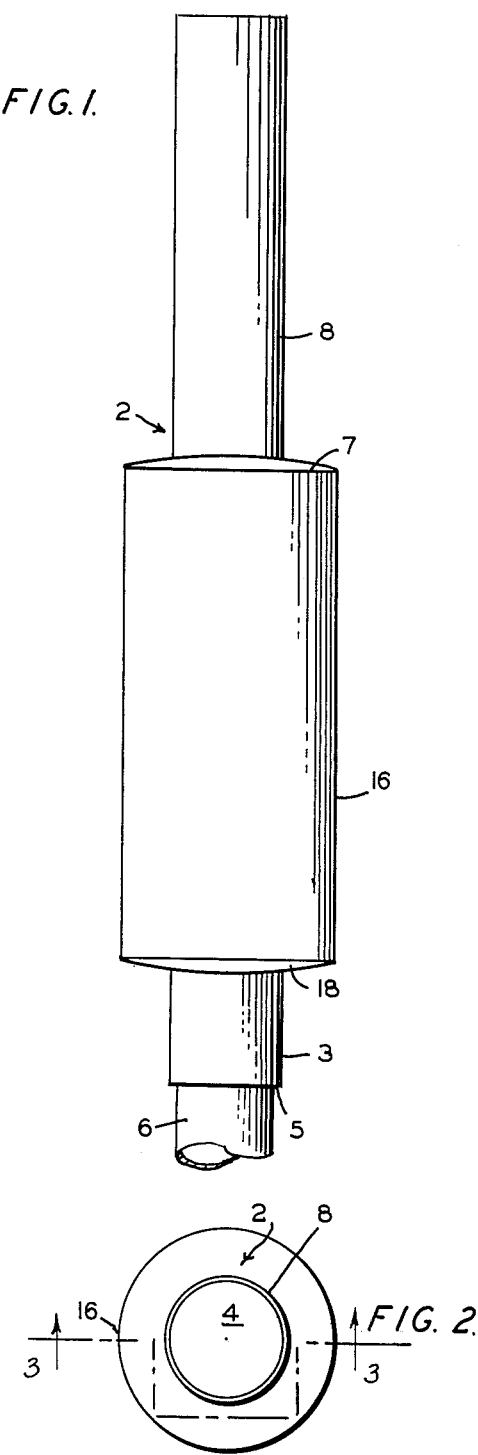
FIG. 1.
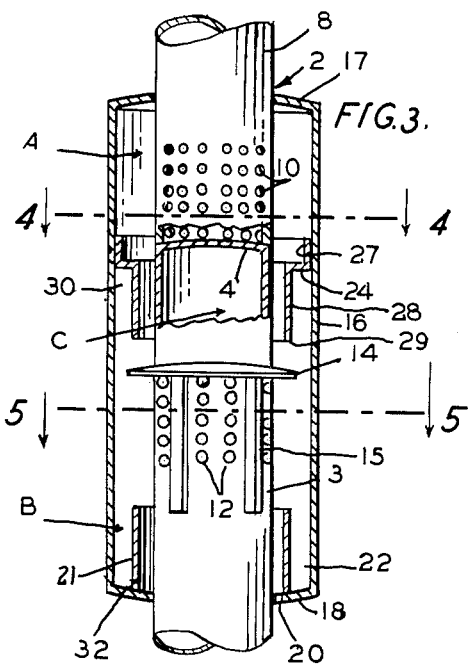
FIG. 3.
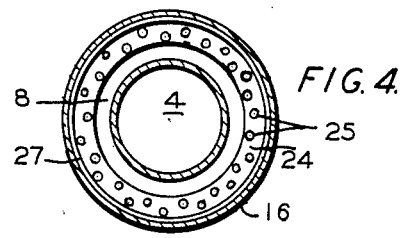
FIG. 4.
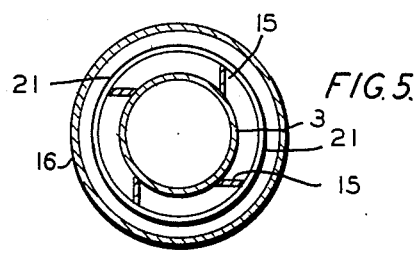
FIG. 5.
FIG. 2.
INVENTOR.
Jess C. Higgins
BY
Scott L. Norvell

United States Patent Office 2,732,913
Patented Jan. 31, 1956

2,732,913

MUFFLER, SPARK ARRESTER, AND WATER TRAP FOR INTERNAL COMBUSTION ENGINES HAVING VERTICAL STACKS

Jess C. Higgins, Buckeye, Ariz.

Application October 11, 1954, Serial No. 461,479

2 Claims. (Cl. 183—96)

This invention pertains to combination mufflers, spark arresters and water traps for internal combustion engines having vertical stacks.

Engines of this type are most frequently used on farm machinery or heavy tractors, or the like, wherein diesel engines are most commonly found.

One of the objects of the invention is to provide a muffler in which the noise of the exhaust is diminished and in which the emission of sparks is entirely eliminated.

A further object is to provide a muffler which may be easily attached to, or detached from, the engine exhaust stack wherein water entering the exposed vertical opening of the exhaust will be by-passed and kept from flowing or otherwise entering into the exhaust stack of the engine.

A still further object is to provide a muffler as herein described wherein particles of carbon which form sparks are retained within the body of the muffler and burned so that no live sparks are ejected from any part of the muffler or exhaust system.

Other objects will appear hereinafter.

I attain the foregoing objects by means of the design, construction and composite arrangement of parts shown in the accompanying drawings in which—

Figure 1 is a side elevation of the muffler as applied to an exhaust stack;

Figure 2 is a plan view thereof;

Figure 3 is a side elevational sectional view taken substantially on line 3—3 of Figure 2;

Figure 4 is a horizontal section of the muffler taken substantially on line 4—4 of Figure 3; and Figure 5 is a horizontal section taken substantially on line 5—5 of Figure 3.

Similar numerals refer to similar parts in the several views.

Referring to the drawings, my muffler spark arrester and weather trap for internal engines has a central core 2 composed of cylindrical steel tubing having a lower part 3 closed at the top by a domed blocking plate 4 and an upper part 8 extending upward from said plate. The exhaust entrance 5 is at the bottom end of lower part 3 and is sized to fit over exhaust pipe 6. The upper core part 8 is of the same diameter as the lower part and the two parts are welded around the edges of plate 4. The lower end portion of core part 2 is perforated by a plurality of closely spaced holes 10 which extend in an annular area entirely around the periphery of this core part. These holes form outlet openings into the upper core part 8.

The lower core part 3 is also perforated by a plurality of closely spaced inlet holes 12. These perforations are arranged in an annular area around the tube, disposed below plate 4. Their aggregate area is approximately equal to that of holes 10.

Just above space occupied by holes 12 is a downwardly dished ring baffle and water deflector 14. Extending from beneath baffle 14 to a position below the area occupied by holes 12 there are a number of angularly extending vertical vanes 15. These are designed to give gases issuing from holes 12 a circular motion.

The core 2, including the portions having perforations 10 and 12, is enclosed by a cylindrical jacket 16. A downwardly dished circular ring 17 closes the upper end of the jacket and joins its upper edge to core part 8. An upwardly dished ring 18 closes the lower end of the jacket and joins its lower edge to lower core part 3. This bottom closure is vented by a hole 20 drilled near the surface of core part 3 which functions as a water drain.

A cylindrical sleeve baffle 21 surrounds the lower unperforated portion of core part 3 within jacket 16 and forms an annular spark particle trap 22 between this baffle and the adjacent wall of jacket 18. Heavy particles of ignited carbon expelled from the engine exhaust, and commonly called large sparks, collect in this trap area.

Just below the level of blocking plate 4 there is an annular ring 24, perforated by a large number of small holes 25, secured at its outer edge to the inner wall of jacket 16, by means of a circular band 27. A cylindrical collar baffle 28 is welded all around its inner edge and depends downward therefrom. The lower edge 29 of this collar baffle is spaced somewhat above the upper face of deflecting ring baffle 14. This structure creates an annular tortuous passageway for exhaust gases passing upward within jacket 16 from perforations 12. These gases pass around the outer edge of baffle 14 and under the lower edge 29 of baffle 28.

The structure also provides an annular trap 30 for light sparks, or small ignited particles of carbon, that are carried upward from perforations 12. The circular motion imparted to the gases by vanes 15 assures that these lighter spark particles will be forced outward toward the walls of the jacket 16 and when forced upward will follow the inner walls of the jacket and enter the area of the trap 30. These small spark particles will be caught and held on the under side of plate 24 over perforations 25, by the upward pressure of the exhaust gases until they burn out.

In use the above device, mounted on an exhaust stack, as stated, acts as a muffler because of the tortuous path imparted to the exhaust gases and the expansion of the high compression puffs of gases into the end chambers A and B formed within the end portions enclosed by jacket 16. Chamber C at the top end of lower core part 3 also tends to muffle exhaust explosions.

The structure of the device acts as a moisture deflector because any rain entering the open top of part 8 is stopped by plate 4, and then flows out through holes 10 and is deflected outward by ring baffle 14 from which it falls into annular spark trap space 22. From this space it is drained through a hole 32 in the lower edge of baffle 21 into the inner annular area between the baffle and the core from which it drains out through hole 20 and flows down along the outside of core part 3.

From the foregoing it will be understood that I have provided a muffler which arrests sparks from the engine by burning out the light sparks, and trapping the heavier spark particles. This device is particularly valuable for use on farm implements where combustible substances such as cotton or grain chaff are likely to be ignited by flames or sparks expelled from the engine exhaust.

I claim:

1. A muffler, spark arrester and water trap for internal combustion engines having vertical exhaust stacks, composed of a cylindrical core having an opening at the bottom adapted to fit onto said exhaust stack, and an exhaust opening at the top, a jacket having end closures enclosing said core, an upwardly domed blocking plate within said core disposed midway of the length enclosed by said jacket closing said core and separating it into an upper part and a lower part, said upper core part having outlet perforations throughout an annular area immediately above said domed plate, and inlet perforations in the lower part of said core disposed in an annular area below said domed plate, a downwardly dished water and gas deflecting baffle attached to said lower core part above said inlet perforations, a spark arresting perforated ring-shaped plate attached to the inner face of said jacket and disposed above the position of said water and gas deflecting baffle, a cylindrical collar baffle attached to the inner edge of said spark arresting plate forming an annular spark arresting trap below said plate and a tortuous annular passageway for gases around said water and gas deflecting baffle, vertical vanes disposed around said inlet perforations and adapted to give gases issuing from said perforations a circular motion, and a cylindrical sleeve baffle in the bottom of said jacket forming an annular spark pocket adjacent the lower portion of the wall of said jacket; said sleeve baffle having a drainage hole in its bottom for draining water which may enter the top of said core and flow through the outlet perforations therein and over said gas and water deflecting baffle into the area surrounding said core in the bottom of said jacket; said jacket lower end closure having an opening to drain said water from the bottom of said jacket.

2. A muffler, a spark arrester and water trap for internal combustion engines having vertical exhaust stacks, composed of a cylindrical core divided into an upper part and a lower part by a domed blocking plate; the upper end of said core being open and constituting an exhaust opening and the lower end of said core being adapted to fit onto the exhaust stack of said engine, a jacket having top and side plates, and a bottom plate provided with a drain hole, enclosing the mid-portion of said core, said upper core part having a plurality of outlet openings arranged in an annular area just above said blocking plate, a perforated annular ring disposed on the inner side wall of said jacket just below the level of said blocking plate having a cylindrical baffle depending from its inner edge forming an annular spark trap for upwardly moving spark particles, said lower core part having a plurality of inlet openings arranged in an annular area below said spark trap and above the bottom of said jacket, a plurality of vertical vanes on the outer surface of said core within the annular area of said inlet openings angularly arranged to direct gases flowing through said inlet openings in a circular path within said jacket, a downwardly dished ring baffle disposed on said lower core part immediately above the area of said inlet openings forming a water and spark deflector, and a cylindrical sleeve baffle, having a water drain hole on its outer edge, surrounding the lower unperforated portion of said core within said jacket and forming an annular heavy spark particle trap.

References Cited in the file of this patent

UNITED STATES PATENTS

| | | |
|---|---|---|
| 677,357 | Hyde | July 2, 1901 |
| 752,386 | Dunlop et al. | Feb. 16, 1904 |
| 1,362,025 | Macaulay | Dec. 14, 1920 |
| 1,556,934 | Hilldring | Oct. 13, 1925 |
| 2,600,262 | Powers | June 10, 1952 |